United States Patent [19]
Reed

[11] Patent Number: 4,975,151
[45] Date of Patent: Dec. 4, 1990

[54] TWO-SPEED SINGLE LEVER STEPPER ACTUATOR

[75] Inventor: Gordon K. Reed, Bexley, Ohio

[73] Assignee: Process Automation Business Inc., Columbus, Ohio

[21] Appl. No.: 404,488

[22] Filed: Sep. 8, 1989

Related U.S. Application Data

[63] Continuation-in-part of Ser. No. 311,915, Feb. 17, 1989, Pat. No. 4,892,623.

[51] Int. Cl.⁵ .............................................. D21F 1/06
[52] U.S. Cl. .................................. 162/259; 162/344; 74/142; 74/522
[58] Field of Search ...................... 162/259, 344, 336; 74/142, 522

[56] References Cited

U.S. PATENT DOCUMENTS

| | | |
|---|---|---|
| 4,526,654 | 7/1985 | Johansson et al. .................. 162/259 |
| 4,726,883 | 2/1988 | Schroeder ............................ 162/259 |
| 4,770,744 | 9/1988 | Dove .................................... 162/259 |

*Primary Examiner*—Karen M. Hastings
*Attorney, Agent, or Firm*—John H. Mulholland

[57] ABSTRACT

A two-speed stepper actuator (10) for rotationally driving a power nut (24) to adjust a slice lip spindle (20) linearly. A clamp for power nut (24) includes a bushing plate (32) driven by drive solenoid (D) which is mounted for rotation relative to power nut (24). A lever (40) is pivotally mounted on the bushing plate (32) and includes an eccentric locking cam surface (50) shaped for selective clearance of nut (24) when in the center or number 2 position and clamping engagement of nut (24) when in the opposite extreme 1 and 3 positions. A first amount of rotation of the lever (40) about its pivotal mounting (48) on said bushing plate (32) engages and locks lever end cam surface (50) against nut (24) and a second and additional rotation of the lever (40) then drives the nut (24). Three position solenoids (L) and (D) drive the bushing plate (32) and lever (40) independently and at different speeds due to an accommodation by spring (36) on pusher rod (34) of solenoid (L).

10 Claims, 3 Drawing Sheets

TWO-SPEED SINGLE LEVER STEPPER ACTUATOR

CROSS REFERENCE TO RELATED APPLICATION

This application is a continuation-in-part of U.S. application Ser. No. 07/311,915 filed Feb. 17, 1989 now U.S. Pat. No. 4,892,623.

BACKGROUND OF THE INVENTION

1. Technical Field

This invention relates to its above identified related application, which is included herein by reference, and is a stepper actuator for rotationally driving a member such as a paper machine headbox slice opening control spindle. The driven spindle is one of a plurality that are evenly distributed across the width of the slice for acting on the control lip of the slice. More particularly, the invention relates to a stepper actuator for rotationally driving the spindles individually in ratchet-like fashion at two speeds, one for "macromotion" of, perhaps, 15 microns of slice lip travel and another for "micromotion" of, perhaps, 1 micron of slice lip travel.

2. Background Art

The slice opening of a headbox on a paper machine meters flow of the pulp slurry or stock in the headbox onto the fourdrinier wire. A number of rotationally driven spindles, perhaps 50 to 60, are connected to a headbox control lip to vary the metering opening transversely across the machine. The spindles typically are threadedly attached at their upper ends to rotationally driven power nuts which linearly drive the individual spindles in known manner. The two-speed stepper actuator of the invention drives the power nuts in a ratchet-like rotational fashion to accomplish the linear spindle motion at either of two speeds.

The rotationally driven power nuts have largely replaced manually adjusted spindles or jack screws on paper machines because they provide for increased linear sensitivity for slice lip adjustment purposes. It has been known to equip each spindle or jackscrew with a separate driving motor and gear reducer. The advantage of being able to power the spindle at a macromotion rate and then to finely adjust the slice lip opening by means of mechanical micromotion has not been available in a stepper actuator before applicant's parent application mentioned above. U.S. Pat. No. 4,770,744 shows a hydraulic two-speed adjustment device for a slice lip. The present invention thus provides a needed mechanical device for fast and accurate control of the slice lip of a headbox.

SUMMARY OF THE INVENTION

The stepper actuator of the invention for use to control the slice lip of a headbox on a paper machine provides ratchet-like rotational drive of a power nut clamped to the end of the slice lip control spindle. The stepper actuator provides good speed of response at two speeds which enables good positional accuracy. It permits the production of control quality paper by basis weight profiles through the elimination of cross-machine variations.

The stepper actuator of the invention includes a cam clamp for engagement with the power nut clamped to the spindle. The cam clamp has a lever with a cam surface to engage the outer periphery of the power nut member to be rotationally driven. The level pivots on a bushing plate which is free to rotate about the power nut. The bushing plate is attached to a locking solenoid through a spring. The solenoid has a center off position and a high and low drive position and is fixed to a housing.

The level clears, i.e., is out of engagement with, the power nut in the center position but the lever cam surface which clears the power nut is eccentric to the lever pivot point such that a slight rotation of the lever frictionally engages the round nut and continued rotation of the lever then causes rotation of the power nut. This provides micro-motion of, typically; 1 micron (0.00004") movement.

Large or macro movement of 15 microns (0.0006") is accomplished by force applied from a drive solenoid which is also fixed to the housing but is pivotally attached to the end of the lever to give macro-movement through the locked up cam lever and bushing plate to the power nut. The spring on the locking solenoid attachment accommodates this movement.

DETAILED DESCRIPTION OF THE PREFERRED EMBODIMENT

Figure 1:
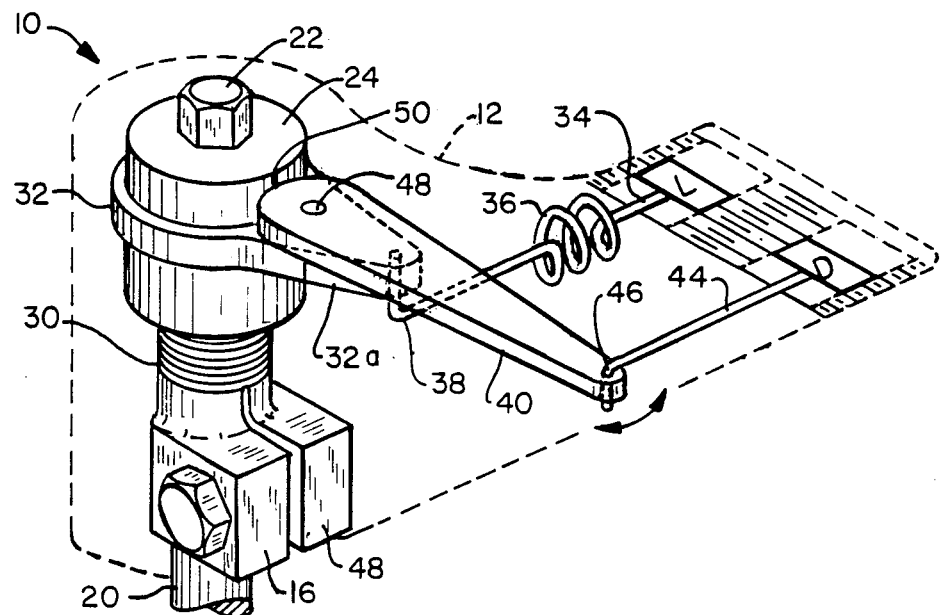
FIG. 1 is a schematic perspective view of a single lever two-speed stepper actuator which includes a solenoid actuated cam clamp, bushing plate and lever arranged in accordance with the principles of the invention.

The numeral 10 generally designates the assembled two-speed stepper actuator of the invention assembled to a power nut and clamped spindle. As see in FIG. 1, the combination or unit may include a cover or housing 12 (shown dotted in) attached to a base plate on the outside of a paper machine headbox. A spindle clamp 16 projects out of the housing which fixes it in a manner (not shown) which prevents rotating of the clamp to drive slice lip control spindle 20 to which it is attached. A hexagonal manual adjustment shaft 22 connected to spindle 20 through the power nut 24 extends through the top of housing 12. A linear variable differential transducer (LVDT) (not shown) may be appropriately provided and electrically connected by cable to the control circuitry. The LVDT probe engages clamp 16 to sense position of the spindle 20 attached thereto and to signal the control circuit accordingly. See U.S. Ser. No. 07/311,915 for an example arrangement of this.

Figure 2:
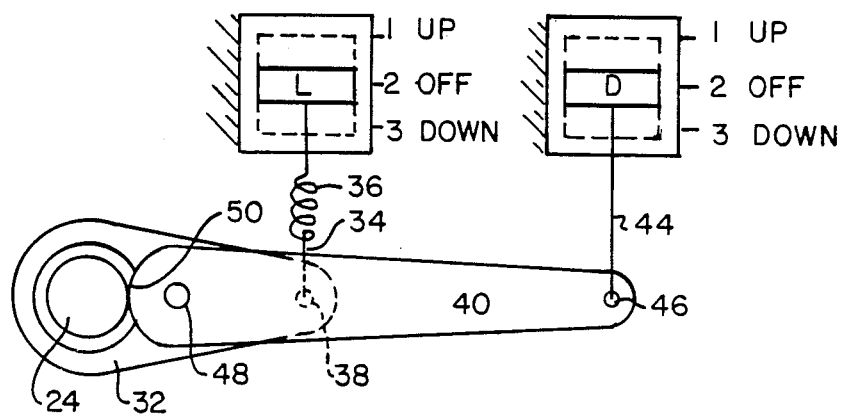
FIG. 2 is a schematic plan view of the two-speed stepper actuator of FIG. 1.

In FIG. 2, the size and shape of the parts are schematically shown and may be somewhat distorted and out of scale. The power nut 24 rides in the housing 12 in bearings not shown for clarity, but well understood in the art. It is only necessary to understand that rotation of power nut 24 causes the linear driving of spindle 20 through non-rotating clamp 16 and its integral threads 30.

Surrounding the power nut 24 and in engagement therewith for free relative rotation is a bushing plate 32. A locking solenoid L with a pusher rod 34 and intermediate spring 36 is connected to an integral arm portion 32a of plate 32 by means of a pivot 38. The solenoid L has an intermediate "OFF" position 2, an extreme "UP" position 1 and an extreme "DOWN" position 3.

A single lever 40 is rotated by a drive solenoid D and connected thereto by means of a push rod 44 and pivot 46. The lever 40 is pivotally attached to the bushing plate 32 by means of pivot 48. The solenoid D also has an intermediate "OFF" position 2, and extreme "UP" position 1 and an extreme "DOWN" position 3. Both solenoids L and D are fixedly mounted to the case or housing 12.

Figure 3:
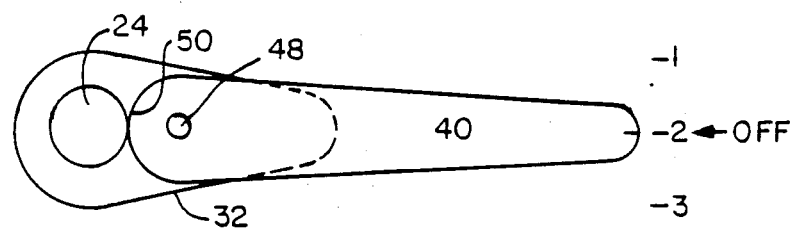
FIGS. 3–9 are schematic plan views of different lever functional positions of the two-speed stepper actuator of FIG. 1.
Figure 4:
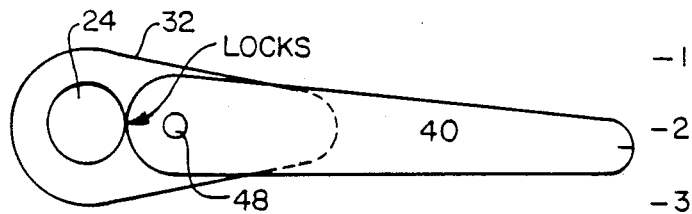
Figure 5:
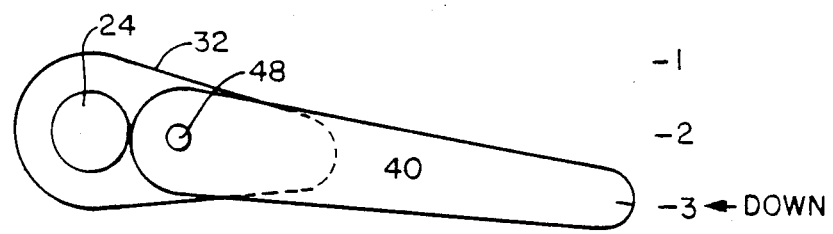

The lever 40 clears the periphery of the cylindrical power nut 24 in the 2 position, (FIGS. 2 and 3) but the lever end cam surface 50 which clears the power nut 24 is eccentric to the pivot such that a slight rotation of the lever 40 (between the 2 and 3 positions, for example, FIG. 4) frictionally engages the cam surface 50 against nut 24. Continued rotation of the lever 40 in the same direction to the 3 or DOWN position (FIG. 5) then causes a small or micro movement rotation of the nut 24 (for instance, 1 micron or 0.00004") and slight linear movement in slice lip control spindle 20.

Figure 6:
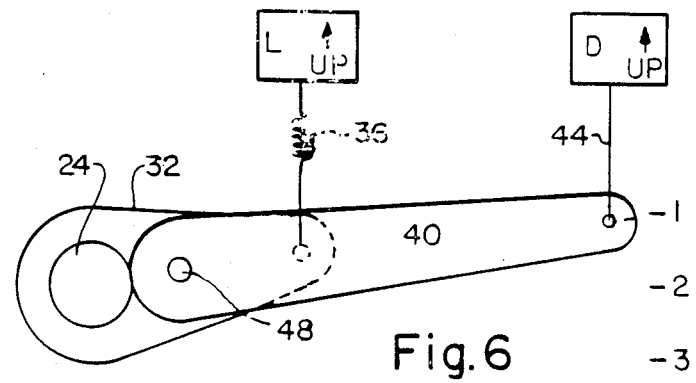
Figure 7:
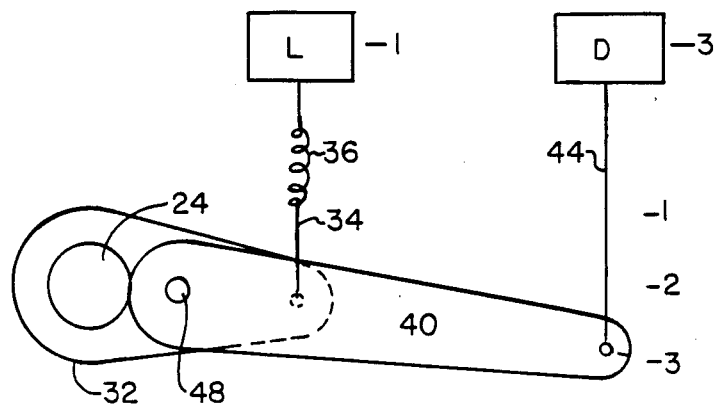
Figure 8:
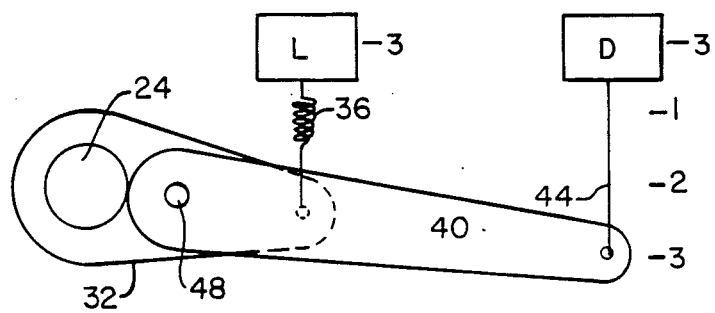
Figure 9:
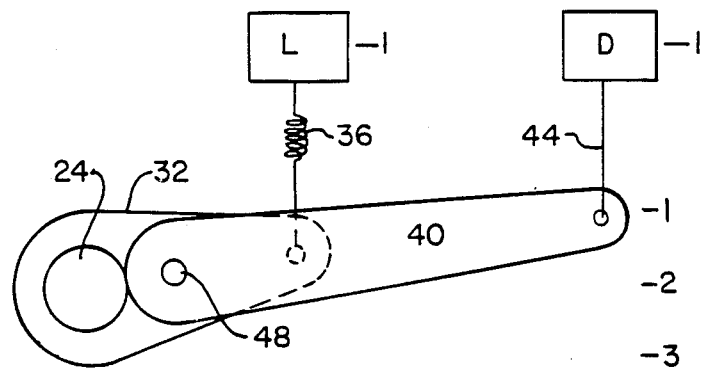

To provide macro-motion, for instance, 15 microns or 0.0006" of motion, the sequence of FIGS. 6 to 9 is utilized. That is, in FIG. 6, both solenoids D and L pull up and the lever is in position 1; drive solenoid D is ready, also in position 1; then, solenoid L locks cam surface 50 eccentric portion on the end of lever 40 to the power nut 24. Then, as seen in FIG. 7 the solenoid D moves down to position 3 causing a large rotation of nut 24 and an extension of spring 36 since solenoid L stays in position 1. Subsequently, the locking solenoid releases, as seen in FIG. 8, and both solenoids L and D pull up to position 1 simultaneously resetting the two-speed stepper actuator 10, as seen in FIG. 6.

Thus, it will be seen that the stepper-actuator of this invention provides the advantages of Ser. No. 07/311,915 with the further advantages that the frictional grip on power nut 24 increases as the lever force increases and the locking solenoid force output required is much less.

I claim:

1. A stepper actuator for rotationally driving a member about an axis of rotation, said actuator comprising;
   a clamp for engagement with said member to be rotationally driven;
   said clamp including a bushing plate mounted for rotation relative to said member about said axis; and,
   a lever pivotally mounted on said bushing plate;
   said lever including means for locking in the form of an eccentric locking cam surface shaped for selective clearance of and engagement with said member;
   whereby a first amount of rotation of said lever about its pivotal mounting on said bushing plate engages and locks said cam surface against said member and a second and additional rotation of said lever rotationally drives said member, said bushing plate and lever being structured and arranged to provide for the member to be driven at at least two different speeds.

2. The stepper actuator of claim 1 in which a means to drive said bushing plate is included.

3. The stepper actuator of claim 2 in which the means to drive said bushing plate is a locking solenoid.

4. The stepper actuator of claim 3 in which the locking solenoid has a pusher rod pivotally connected to said bushing plate.

5. The stepper actuator of claim 4 in which the pusher rod includes a spring.

6. The stepper actuator of claim 2 in which the means to drive said bushing plate has three functional positions, a first extreme position, a second OFF position and a third extreme position opposite said first position and the different speeds are dependent on the position of the means to drive.

7. The stepper actuator of claim 1 in which a means to drive said lever is included.

8. The stepper actuator of claim 7 in which the means to drive said lever is a drive solenoid pivoted to said lever.

9. The stepper actuator of claim 8 in which the drive solenoid has a pusher rod pivotally connected to said lever.

10. The stepper actuator of claim 7 in which the means to drive said lever has three functional positions, a first extreme position, a second OFF position and a third extreme position opposite said first position and the different speeds are dependent on the position of the means to drive.

* * * * *